United States Patent [19]
La Russa

[11] 3,711,826
[45] Jan. 16, 1973

[54] INSTRUMENT LANDING APPARATUS FOR AIRCRAFT

[75] Inventor: Joseph La Russa, Yonkers, N.Y.

[73] Assignee: Farrand Optical Co., Inc., Bronx, N.Y.

[22] Filed: May 23, 1969

[21] Appl. No.: 827,359

[52] U.S. Cl. ............340/27 NA, 35/12 N, 178/7.88, 350/174, 353/28, 343/108 SM
[51] Int. Cl. ..........................G08g 5/02, G03b 21/26
[58] Field of Search ......343/108 SM; 353/12, 13, 14, 353/28; 340/24, 27 NA; 178/7.88, DIG. 20; 350/174; 35/12 N

[56] References Cited

UNITED STATES PATENTS

| | | | |
|---|---|---|---|
| 3,551,043 | 12/1970 | Neuberger al. | 350/174 X |
| 3,508,822 | 4/1970 | Cornell et al. | 350/50 X |
| 2,448,023 | 8/1948 | Folland | 343/108 SI |
| 3,164,830 | 1/1965 | Powley et al. | 343/108 SI |
| 3,237,194 | 2/1966 | Curry, Jr. et al. | 343/108 SI |

OTHER PUBLICATIONS

R. P. Snodgrass, "On-the-Windshield Displays," Control Engineering, Jan. 1966, pp. 61–66.

*Primary Examiner*—Benjamin A. Borchelt
*Assistant Examiner*—R. Kinberg
*Attorney*—Pennie, Edmonds, Morton, Taylor and Adams

[57] ABSTRACT

There is disclosed apparatus for instrument landing of aircraft presenting to the pilot, from glide path and range signals originating on the ground and from aircraft-originated signals on altitude, airspeed and aircraft attitude, a three-dimensional representation of a roadway in the sky down which the aircraft is to be navigated to a touchdown point on an airport runway, together with indications of the departure of the aircraft from proper position and altitude with reference to that roadway, and departures from desired airspeed along it.

2 Claims, 34 Drawing Figures

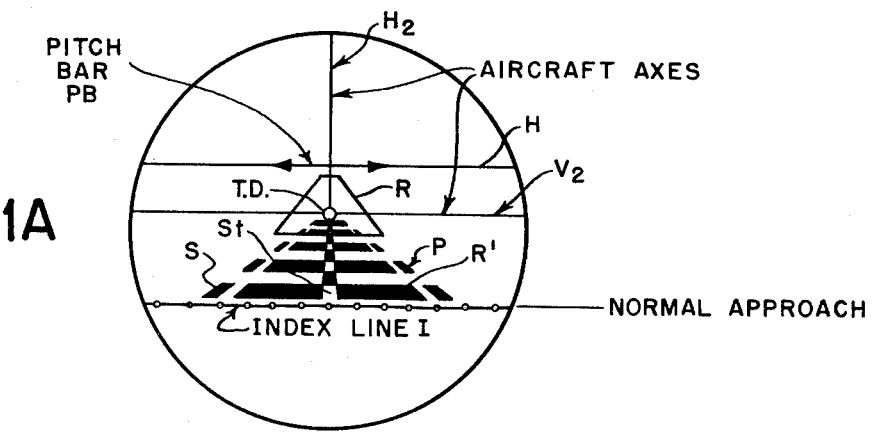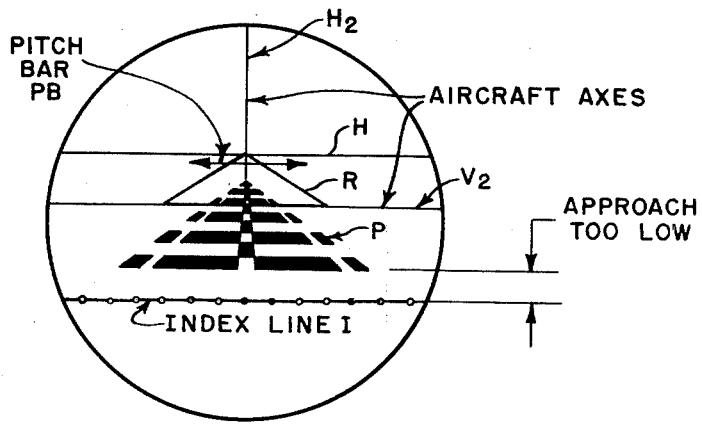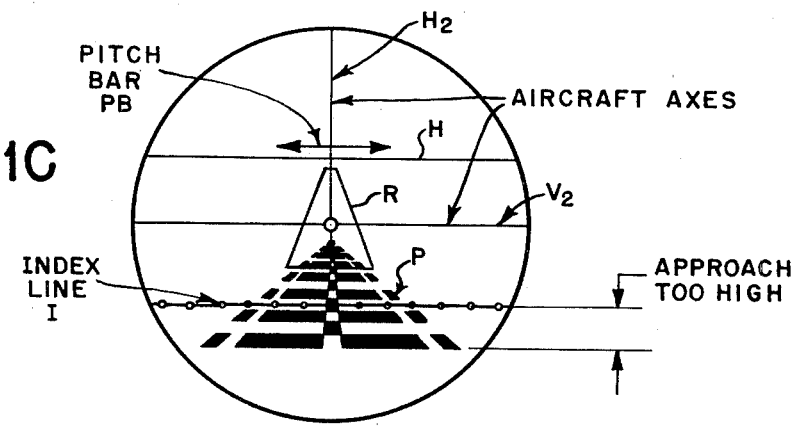

AIRCRAFT ROLLED AN ANGLE ∅ TO THE RIGHT

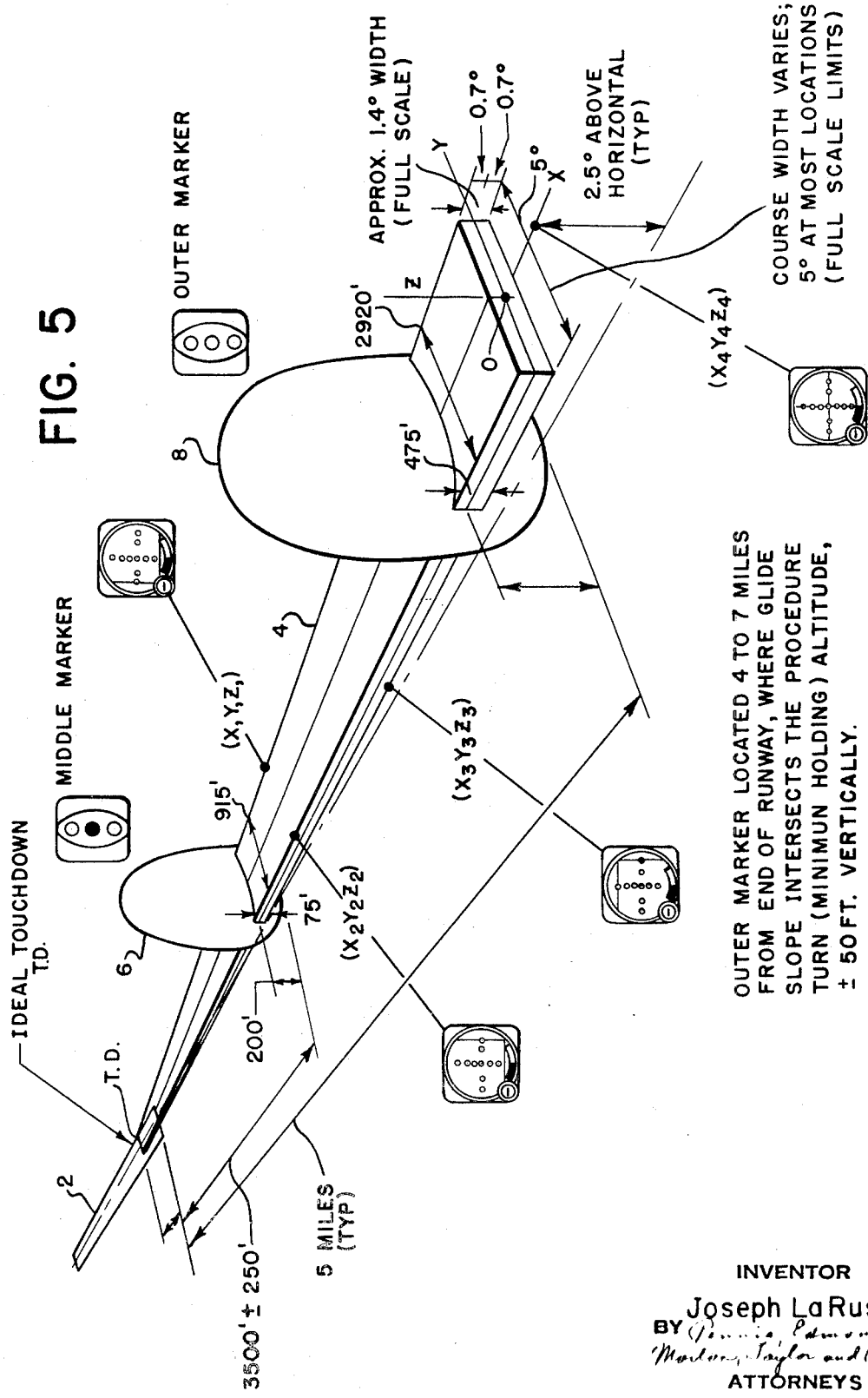

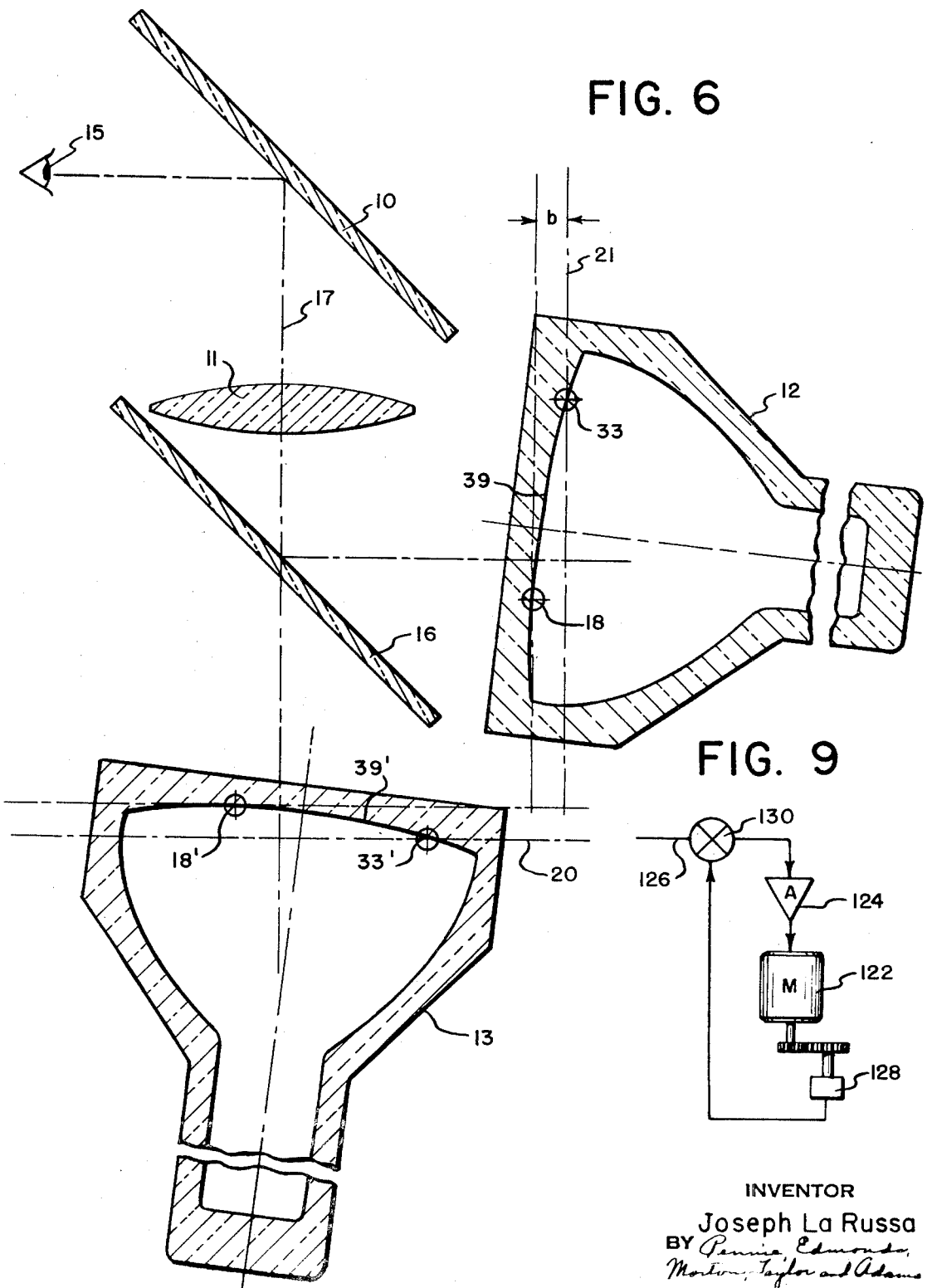

$\alpha$ = CONSTANT GLIDE SLOPE ANGLE

FIG. 14
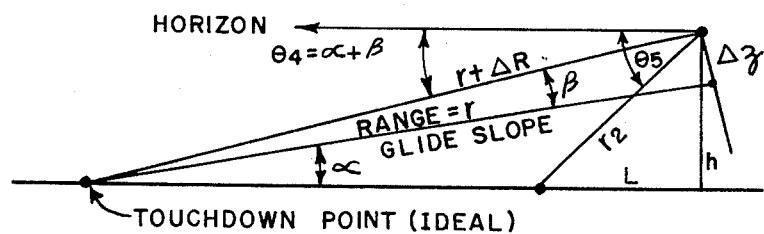
FIG. 15
FIG. 16
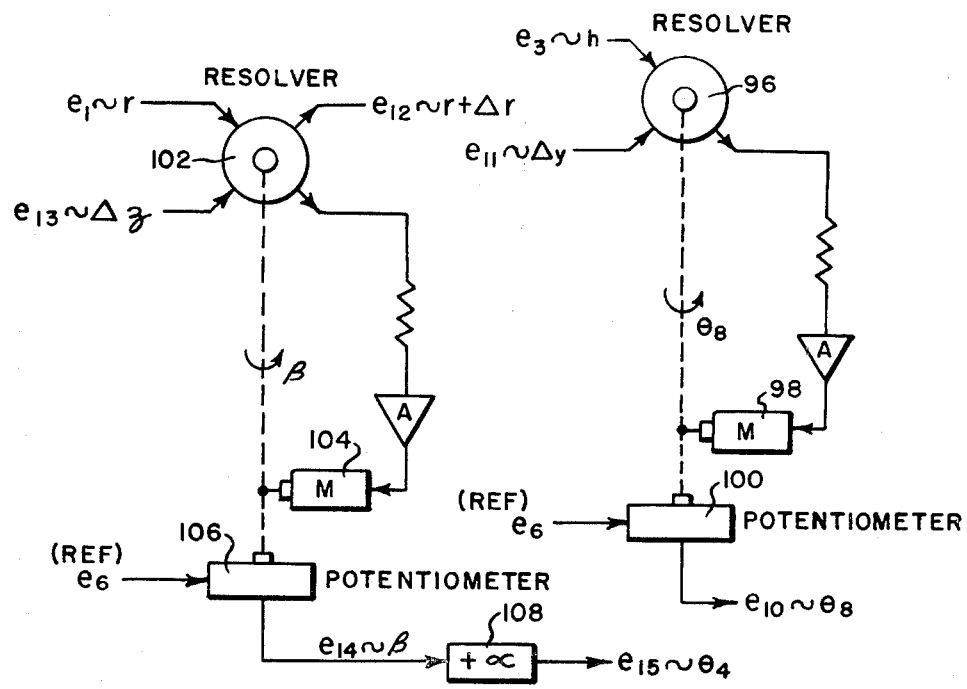

FIG. 17A
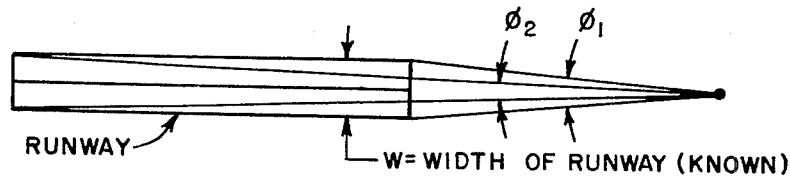
FIG. 17B
FIG. 17C
FIG. 17D
TRIANGLES TO BE SOLVED
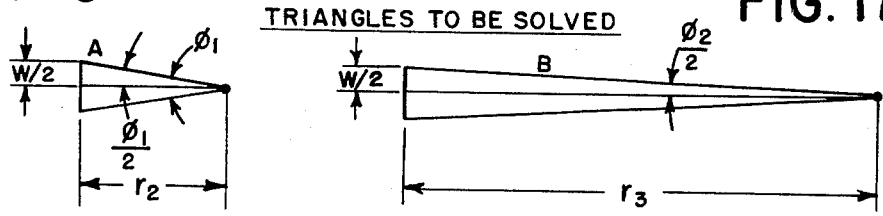
FIG. 18
FIG. 19
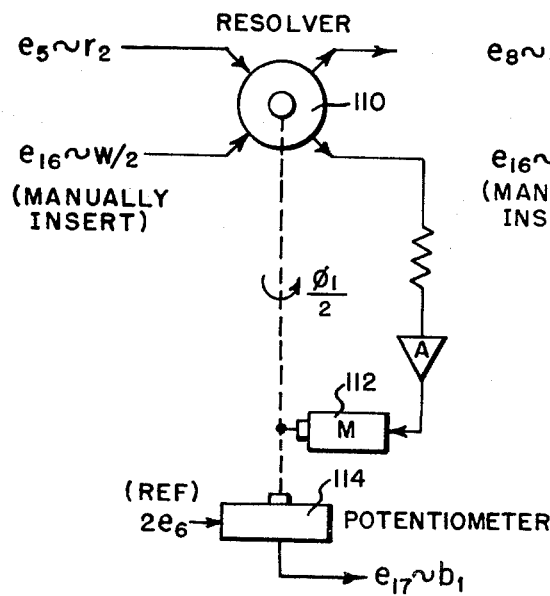
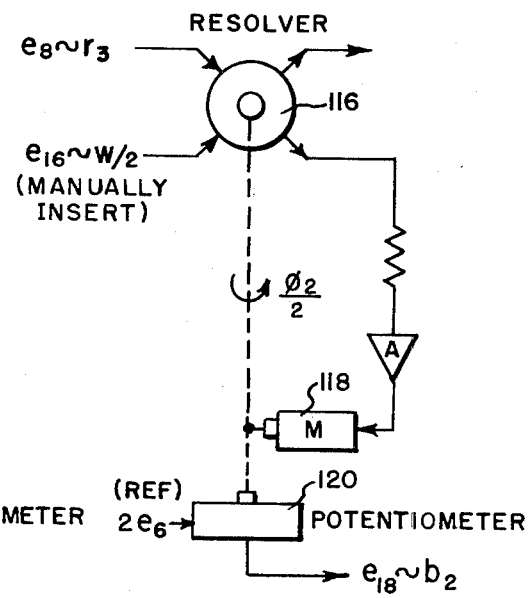
INVENTOR
Joseph La Russa
BY
ATTORNEYS

FIG. 20

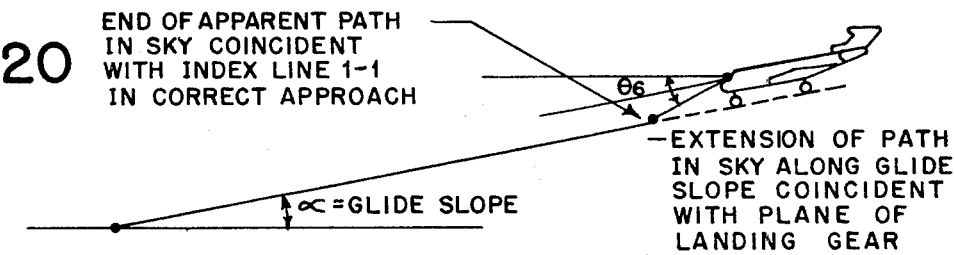

END OF APPARENT PATH IN SKY COINCIDENT WITH INDEX LINE 1-1 IN CORRECT APPROACH

EXTENSION OF PATH IN SKY ALONG GLIDE SLOPE COINCIDENT WITH PLANE OF LANDING GEAR $\alpha$ = GLIDE SLOPE

FIG. 21

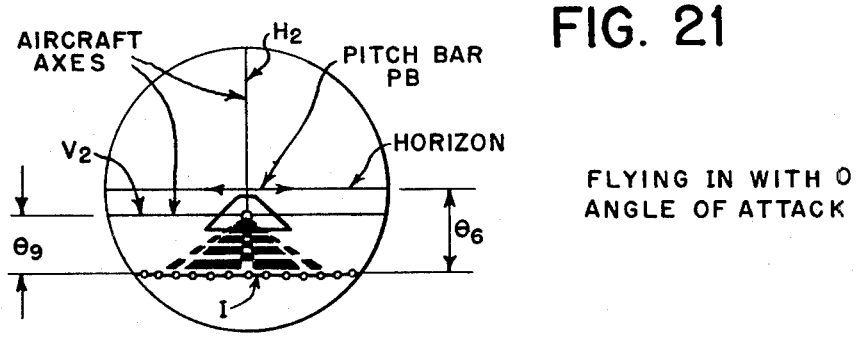

FLYING IN WITH 0 ANGLE OF ATTACK

FIG. 22

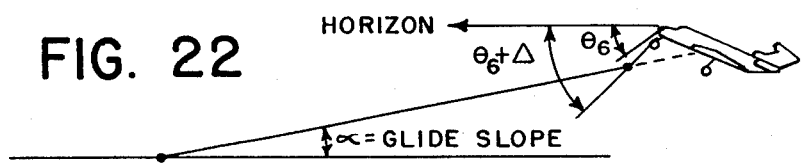

$\alpha$ = GLIDE SLOPE

FIG. 23

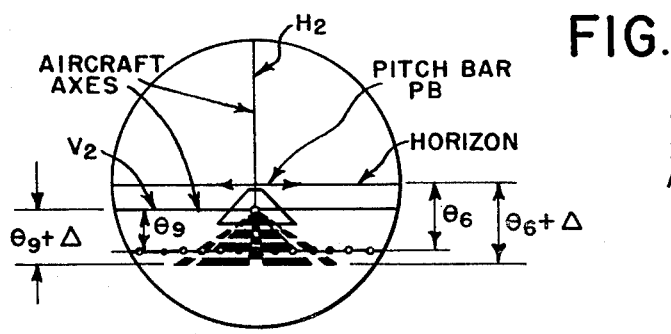

FLYING IN WITH INCREMENTAL ANGLE OF ATTACK $\Delta$

INVENTOR
Joseph La Russa
BY *Pennie, Edmonds, Morton, Taylor and Adams*
ATTORNEYS

INSTRUMENT LANDING APPARATUS FOR AIRCRAFT

BRIEF DESCRIPTION OF THE DRAWINGS

The invention will now be further described in terms of a presently preferred non-limitative exemplary embodiment and with reference to the accompanying drawings, in which:

FIGS. 1A to 1C, 2A to 2C, 3A to 3C, and 4 are diagrams illustrating the pictorial representation presented, under various conditions of aircraft position and attitude, by the apparatus of the invention to the pilot of an aircraft equipped with one form of apparatus according to the invention;

FIG. 5 is a diagrammatic representation of the pattern of radio signals employed in one known form of instrument landing system with which the invention may be used;

FIG. 6 is a schematic diagram of one form of display apparatus according to the invention;

FIG. 9 is a diagram of one of the servo drives of the apparatus of FIGS. 7 and 8;

FIG. 14 is another diagram useful in describing the invention;

FIG. 15 is a diagram of apparatus useful, in one embodiment of the invention, in generating electrical signals representative of the slant range from the aircraft to the intended touchdown point on the runway when the aircraft is above or below the instrument landing glide path;

FIG. 16 is a diagram of apparatus useful, in one embodiment of the invention, in generating electrical signals representative of the angle whose tangent is the ratio of the lateral displacement of the aircraft from the center line of the instrument landing glide path to the aircraft altitude, and by which angle the runway is to be laterally displaced on the display of the invention;

FIGS. 17A, 17B, 17C, and 17D are diagrams useful in explaining the invention;

FIGS. 18 and 19 are diagrams of apparatus useful, in one embodiment of the invention, in generating electrical signals representative respectively of the widths of the near and far ends of the runway as it is to be displayed on the display apparatus of the invention;

FIGS. 20 and 22 are diagrams useful in explaining the invention; and

FIGS. 21 and 23 are corresponding diagrams, showing portions of the display related respectively to FIGS. 20 and 22.

Figure 2A:
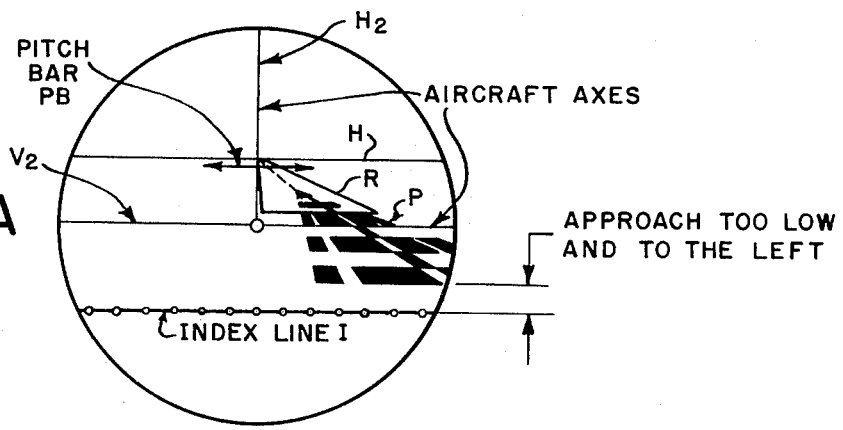

Referring first to FIG. 5, there is shown diagrammatically an airport runway 2, a glide pattern 4 of radio signals, and two marker beacon radio signal patterns 6 and 8. Apparatus for generating radio signal patterns of this type is well-known. The pattern of glide path signals 4 includes an axis 0 leading to a touchdown point T.D. on the runway 2. Along this axis, space is divided into four quadrants as indicated by the X, Y and Z axes in FIG. 5, the radio signals of the glide path pattern having a distinctive character in each of these quadrants.

Radio receiving equipment for use in aircraft is also well-known which senses in which of the four quadrants of space the aircraft is located. There is then presented to the pilot, in such known instrument landing system, a display in the form of two crossed pointers which intersect in the appropriate quadrant when the aircraft is off the axis of the glide path.

The marker beacons give successive range indications, but continuous range indicating devices are also known, and a signal representative of instantaneous range to the touchdown point T.D. is assumed to be available to the apparatus of the present invention.

The present invention proposes to provide, instead of a pair of crossed needles indicating merely location in one of four quadrants of space, or steering directions (i.e., command information), a display perceived by the pilot as a three-dimensional roadway or "path in the sky" extending down to the touchdown point, on which is superposed, in suitable relative position, an indication of the position of the aircraft relative to that path in the three translational and three rotational degrees of freedom. In addition, correct rate of change information is provided by the display as well as actual and desired airspeed and desired angle of attack and its variation.

Referring to FIG. 6, it will be seen that the display of the invention comprises a semi-transparent mirror 10, an image forming device having dioptric power diagrammatically indicated as a binocular eyepiece lens 11, and one or preferably two cathode ray tubes 12 and 13. When two such tubes are provided, the observer (whose eye position is indicated at 15) sees both with the aid of a second partially reflecting mirror or beam splitter 16. The observer sees in addition his natural field of view, i.e., to the exterior of the aircraft, through the beam splitter 10. The optical axis of the lens 11 is indicated at 17. While the eye position of the observer is indicated as being on the optical axis, this is not necessary. The observer has substantial freedom for head movement with the apparatus of the invention without loss of view of the information displayed on the cathode ray tubes.

With the aid of these cathode ray tubes, the observer, e.g., the pilot of the aircraft, sees a pictorial representation of the type illustrated in FIGS. 1 to 4. In addition, and subject to the conditions of visibility existing, the pilot sees his actual approach to the landing through the beam splitter 10 and the windscreen of the aircraft.

The lens 11 and beam splitters 10 and 16 are fixable in the aircraft, desirably with the optical axis 17 to the left of beam splitter 10 and to the right of beam splitter 16 oriented parallel to the longitudinal axis of the aircraft. The tubes 12 and 13 are movable transversely of the optical axis (as produced to their positions respectively), and are also rotatable about axes 18 and 18' fixed with respect to those tubes respectively. These motions are effected by means of the apparatus shown in FIGS. 7 to 9. The translation of the tubes may be in the plane of FIG. 6, to which the axes 18 and 18' are perpendicular. The focal plane of lens 11 is indicated at 20, and the image of this focal plane in the beam splitter 16 is indicated at 21.

Figure 8:
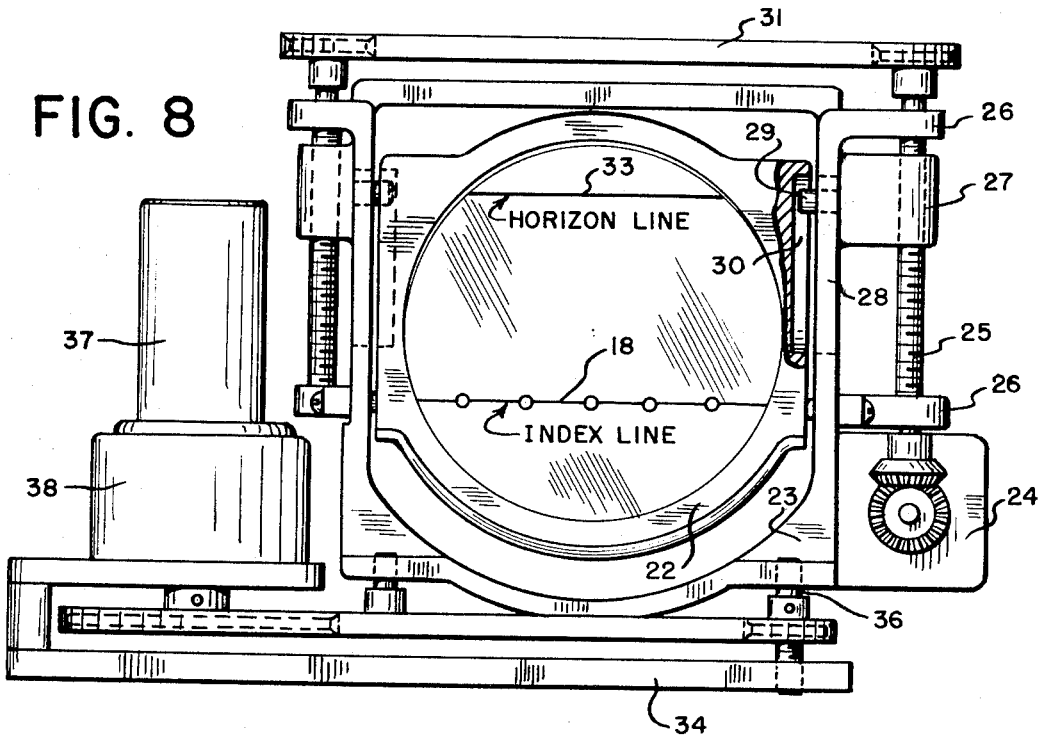
FIG. 8 is a view in front elevation of the apparatus of FIG. 7.
Figure 7:
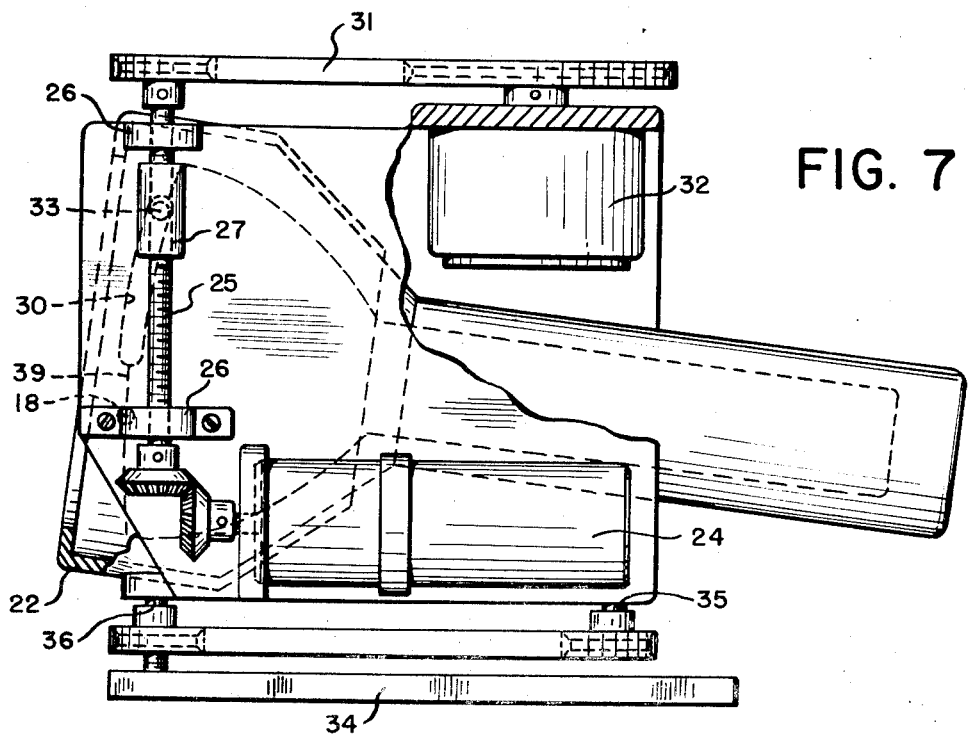
FIG. 7 is a diagrammatic view in side elevation of one of the cathode ray tubes of the apparatus of FIG. 6 together with the mounting therefor.

Referring to FIGS. 7 and 8, the tubes 12 and 13 are supported each in a cradle 22. The cradle in turn is supported on pins from a yoke 23 for rotation with respect to the yoke about an axis 18. The axis is fixed with respect to the tube as well as with respect to the yoke and passes at or near the phosphor-coated fluorescent surface on the inside of the tube face. The yoke supports a motor 24 which drives a lead screw 25 journaled in the yoke at bearings 26. A nut 27 is threaded onto the lead screw. The nut is prevented from turning by engagement at a flat face thereof with a flat face on the yoke indicated at 28 in FIG. 8. A pin 29 is affixed to the nut and extends into an arcuate slot 30 cut into a side face of the cradle 22. The lead screw, nut, pin and arcuate slot may be provided in duplicate on opposite sides of the tube as indicated in FIG. 8, the two lead screws being coupled together by means of a belt 31 which moreover passes over the drive member of a potentiometer 32 (FIG. 7). The arcuate slots may conform to the curvature of the phosphor surface of the cathode ray tube face 39.

The pins 29 define an axis 33 which like the axis 18 (FIG. 6) passes over or adjacent to the phosphor-coated surface 39 of the tube. The separation of the axes 18 and 33 is thus variable, as the axis 33 is moved over the tube face with motion of the nuts 27. The effect of such motion of the nuts is to rotate the tube about its axis 18.

The yoke 23 is movably supported from a base 34 by means of guide pins 35 up and down which the yoke, carrying with it the cradle and the tube, is moved in translation by operation of a lead screw 36 driven from a motor 37. The motor is coupled to a potentiometer 38.

Referring again to FIG. 6, the axis 33 of tube 12 is shown as being located in the focal plane 21 of lens 11, and the corresponding axis 33' of tube 13 is likewise in the focal plane 20 of that tube. This is achieved by correct positioning of the pins 29 in the tube-carrying structure of FIGS. 7 and 8 (of which one set is provided for each of tubes 12 and 13) with respect to the lens 11 and mirror 16 of FIG. 6. The axes 18 and 18' in contrast are located "inside" the focal plane, i.e., nearer to the lens than its focal plane.

Portions of the faces 39 and 39' of tubes 12 and 13 in the focal planes 20 and 21 are perceived by the viewer as being located at infinity, whereas portions of those tube faces closer than that focal plane are perceived, in the form of an enlarged virtual image, as being at a finite distance, as with a simple magnifier. Portions of the faces 39 and 39' outside the focal planes are not used.

Referring now to FIG. 1A, there is shown the display seen by the pilot on a correct approach. The trapezoid R represents the runway, as it would be seen in perspective. The substantially triangular pattern P represents the "path in the sky" down which the aircraft is to be "driven" to the touchdown point T.D. at the apex of the pattern P. There is also seen an artificial horizon line H, an index line I, a pitch bar P.B. (which may depart from line H as indicated in FIGS. 1B and 1C), and fixed aircraft axis or reticle lines $H_2$ and $V_2$. These lines and patterns are all generated by illumination of the fluorescent screens of the cathode ray tubes 12 and 13.

The picture thus includes several components. These may be distributed as desired among the two tubes 12 and 13, with which are associated separate scanning generators and intensity control units to be described in conjunction with FIG. 10. Advantageously, the tube 13 displays the runway pattern R, artificial horizon line H, and aircraft axis lines $H_2$ and $V_2$. Tube 13 thus constitutes means to present, as an object to eyepiece lens 11, a representation of a runway formed on a surface (the fluorescent screen of the tube) which intersects the focal surface 21 of the eyepiece lens 11 and a portion of which is between lens 11 and that focal surface. The tube 12 displays the path P, the index line I, and the pitch bar line P.B. The artificial horizon line H and the aircraft axes $H_2$ and $V_2$ may alternatively be displayed on tube 12.

Although the embodiment shown in FIG. 6 employs two cathode ray tubes, it is possible, consistently with the invention, to provide all necessary displays on a single cathode ray tube.

The horizon line H is a line horizon, presented to the pilot in the form of horizontal collimated light, its location on the tube face being determined in response to inputs (FIG. 10) representative of aircraft pitch and true level, the latter coming from an inertial platform in the aircraft. Aircraft pitch axis line $H_2$ in contrast is presented to the pilot in the form of collimated light parallel to the longitudinal axis of the aircraft.

The aircraft yaw axis line $V_2$ is also presented to the pilot in the form of collimated light parallel to the longitudinal axis of the aircraft.

The intersection of lines $H_2$ and $V_2$ therefore defines the longitudinal axis of the aircraft. Line $H_2$ is described as the pitch axis of the aircraft because departure of the artificial horizon line H along that axis $H_2$, from the line $V_2$, is indicative of the pitch angle of the aircraft. The pitch bar P.B. can be set in at a desired height above the line $V_2$ such that, when the aircraft attitude is adjusted to superpose the pitch bar on the artificial horizon H, as indicated in FIG. 1A, the aircraft possesses a desired pitch angle, i.e., a desired inclination of its longitudinal axis to the horizontal.

The index line I is a trace (which may be of dash-line form) displayed on the fluorescent screen 39 of tube 12 inside the focal plane 21 of the lens 11 (as imaged in the beam splitter 16). This location is so chosen that the image of that trace is perceived by the pilot or observer (whose eye position is indicated at 15 in FIG. 6) as being located a fixed finite distance away from him. Advantageously the index line, i.e., the trace, is so located that the image thereof appears at the intersection of the plane defined by the aircraft landing gear with the line of sight from the pilot's position to the nearest point which the pilot can see on the ground when the aircraft is on the ground.

Figure 2B:
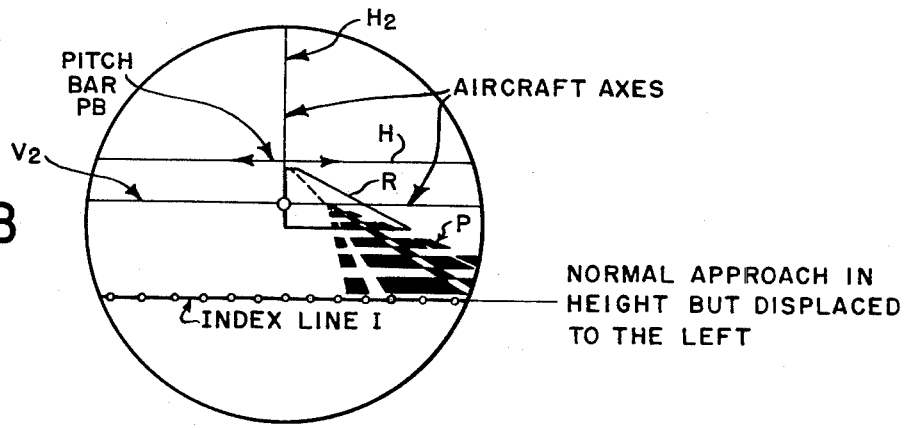
Figure 2C:
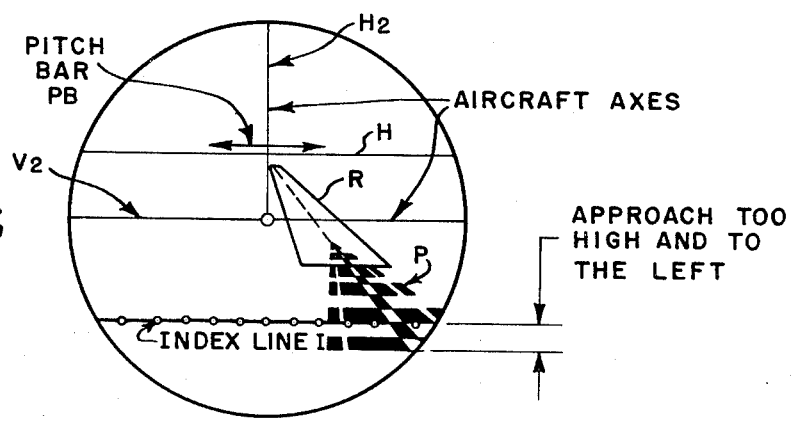
Figure 3A:
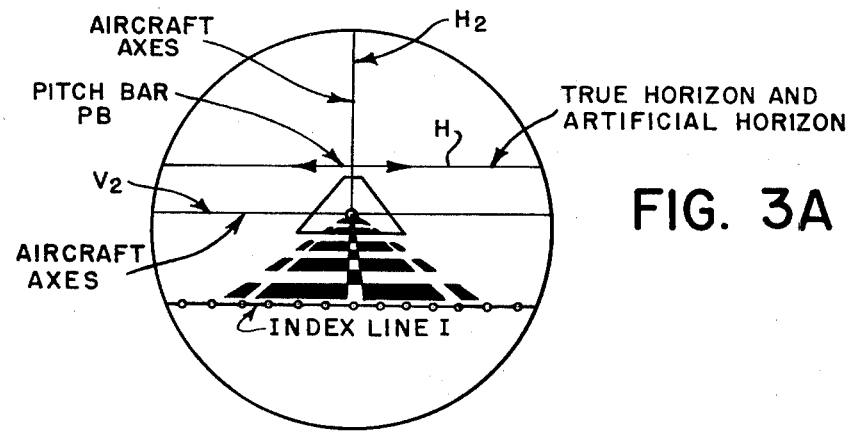
Figure 3B:
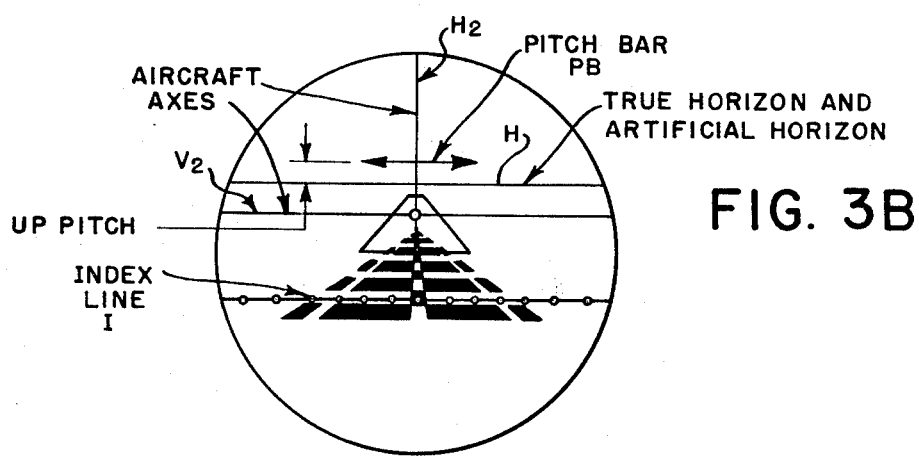
Figure 3C:
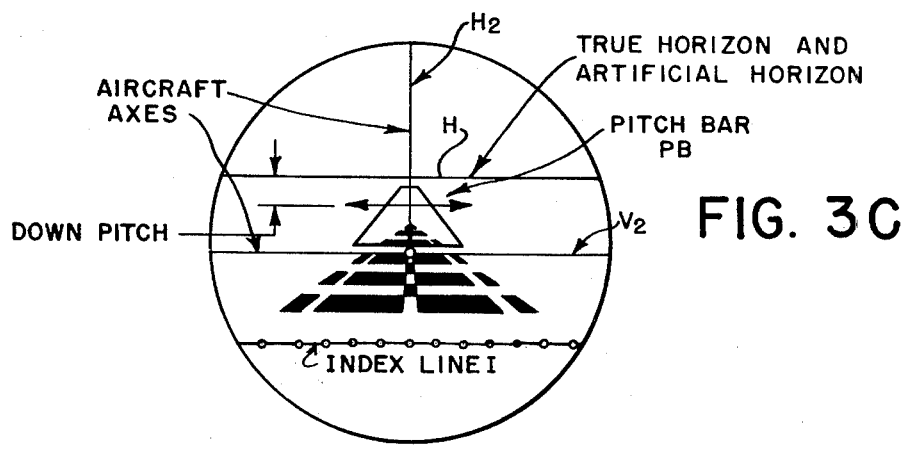

Referring now again to FIG. 1A, 1B, and 1C, these three figures illustrate the appearance of the display for a normal approach, an approach which is too low, and an approach which is too high respectively. In the normal approach, it will be seen that the pilot has set the displacement between index line I and pitch bar P.B. such that the index line appears at the edge of the path P and the pitch bar is superposed on the horizon H when the aircraft axis lines $H_2$ and $V_2$ intersect at the ideal touchdown point T.D. In FIG. 1B the aircraft is approaching too low and as a result the index line has moved below the path P. If the angle of attack (i.e., the angle between the longitudinal axis of the aircraft and its direction of flight) is essentially zero, then the intersection of the aircraft axis lines $H_2$ and $V_2$ indicates the touchdown point as occurring prior to the ideal touchdown point. The pitch bar should appear very slightly below the horizon, not because pitch has changed but only because of the lower position of the aircraft in space. For all practical purposes the pitch bar should remain coincident with the horizon if the artificial horizon will rise and fall with minor vertical excursions. FIG. 1C indicates an approach that is too high, and the aircraft axis lines $V_2$ and $H_2$ indicate at their intersection a projected touchdown point further down the runway than what normally would be considered ideal. Again due to the insensitivity in reproducing the artificial horizon with minor vertical excursions, the pitch bar which was set manually with respect to index line and aircraft axis lines will move together with these lines and may separate slightly from the artificial horizon H. In FIG. 2 the appearance of the display indicates that the aircraft is displaced to the left of the runway. In FIG. 2A the approach is too low as well as displaced to the left, in FIG. 2B the approach is at correct altitude but displaced to the left, and in FIG. 2C the approach is too high as well as displaced to the left. In FIG. 3 the effect of pitch changes is shown. In FIG. 3A for example, the approach is a normal one whereas in FIG. 3B, displacement of the index line I the aircraft axis lines $H_2$ and $V_2$ and the pitch bar P.B. indicate up pitch. In FIG. 3C down pitch is indicated.

Figure 4:
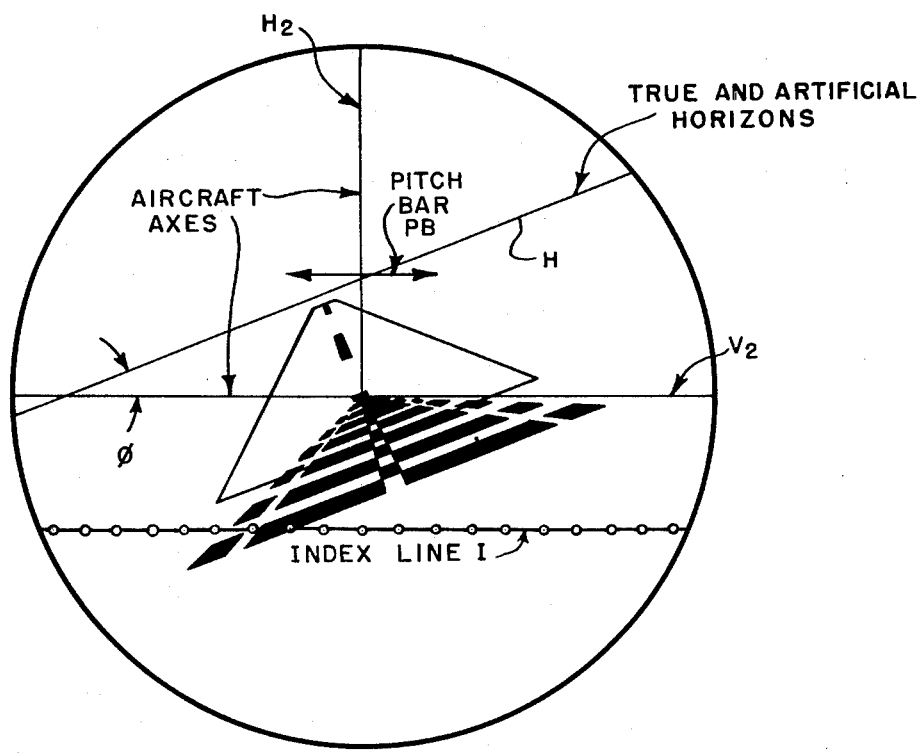

FIG. 4 illustrates the display seen when the aircraft is rolled at angle $\phi$.

FIG. 5 illustrates the glide slope and its tolerances generated in the sky by radio waves. The present invention makes the center plane of the pathway of FIG. 5 visible to the eye in a three-dimensional display.

Signals proportional to aircraft displacement up-down and left-right from the glide path axis 0 of FIG. 5 are available in the aircraft. These proportional signals are applied together with other signals such as roll, pitch and yaw from an inertial platform and range-to-touchdown information to completely energize the display.

Roll of the display presented to the observer may be provided for in the apparatus of FIGS. 6 to 9 either electrically or mechanically, for example by suitable change of the deflection signals, or by rotation of deflection coils or of the tubes themselves. As shown in FIG. 6, the intersection of tube face 39 with focal plane 21 produces a line (the axis 33) at this intersection, normal to the plane of the drawing, which lies in the focal plane 21. An illuminated trace on the cathode ray tube face at this location is presented to the observer in collimated light, i.e., at infinity. When the tube is positioned to locate axis 33 at a height such that illumination of the tube face along that axis produces light which is transformed by the lens 11 into a horizontal collimated bundle, then electron excitation of the fluorescent screen 39 of the tube 12 along that axis presents to the observer an artificial horizon line. This line may however be presented on the tube 13 instead. Points on the tube face 39 to the left of the focal plane 21 in FIG. 6 are presented to the observer in the form of virtual images at finite distances. There can thus be presented an image in the form of a continuum of points apparently lying in a plane extending from infinity up to the close vicinity of the observer. It is on this plane that is presented to the observer the path P of FIGS. 1 to 5. The total length of this plane representing the path length from aircraft to touchdown point is variable by varying the raster on the tube face 39 in vertical length. However, the apparent distance from beginning to end of the path length must also be variable and for this purpose the tube 12 is tilted about axis 18. Tilting the tube face is also effected in response to signals where the horizon may move up or down on the tube face and since the horizon must be maintained exactly in the focal plane 21 it may also be necessary to tilt the tube to retain the horizon in the focal plane 21.

The index line I and the path P (except for the most distant portion thereof) are thus presented to the observer, pilot or otherwise, in the form of virtual images at finite distances from him. These images, being at finite distances, are presented in divergent non-parallel light. Consequently motion of the observer's eye across the divergent bundle making up each of these image points produces apparent motion between that image point and the background at infinity. This "motion parallax" gives to the observer a strong cue of the third- or depth-dimension of objects in space. It is by this presentation of the path P in the form of a virtual image, various portions of which are at various distances, that the invention presents to the observer a three-dimensional "path in the sky" down which to guide the aircraft.

If the separation of the object from the focal plane 21 is $b$ (FIG. 6) and if the focal length of the lens 11 is $f$, then the distance $a$ from the lens to the virtual image of that object is given by the formula:

$$a = (f^2/b) + f$$

or, $$b = f^2/(a-f)$$

For example, if the near end of the path P is to appear to be twelve feet away and if the lens 11 has a 7-inch focal length, the object defining that near end of the path must be distant from the focal plane by a distance $b$ which is:

$$(49 \text{ in.})^2/(144 \text{ in.} - 7 \text{ in.}) = 0.357 \text{ in.}$$

This object takes the form of a fluorescent trace on the screen 39 of the cathode ray tube 14.

Three-dimensional projection may also be accomplished by interposing a variable optical thickness between generated image and projection lens in order to effectively vary the longitudinal location of image points with respect to the projection lens. This variable optical thickness may take many forms such as for example an optically clear liquid contained between plane-parallel glass plates surrounded by a deformable rubber bellows such that a variable wedge effect may be achieved. For convenience, the drawings illustrate a projection cathode ray tube 12 which is to achieve a separation for various points from the focal plane. It should be noted that an illuminated variable mask type of reticle may be used in place of a cathode ray tube.

The three-dimensional landing display consists of a special head-up type visual unit with an articulated cathode ray tube display input. The final display seen by the operator consists of the external world scene combined, with two other discrete inputs at the beam splitter 10. Additional internal combination of dynamic information and fixed fiducial marks takes place at the internal beam splitter 16.

In normal operation, the tube 12 is inclined with respect to the focal plane 21 of the collimating lens 11. The intersection of the optical focal plane with the tube face 39 represents infinity, and the artificial horizon H may be displayed there.

In the event that the aircraft is above or below the normal instrument landing system glide slope-axis 0 (FIG. 5), the flight path displayed on the tube face will be appropriately positioned to portray the required corrective action.

In the event of aircraft pitch different from the normal pitch attitude for landing of the particular aircraft, the scene on the cathode ray tube will be vertically displaced to correctly locate the horizon.

Figure 10:
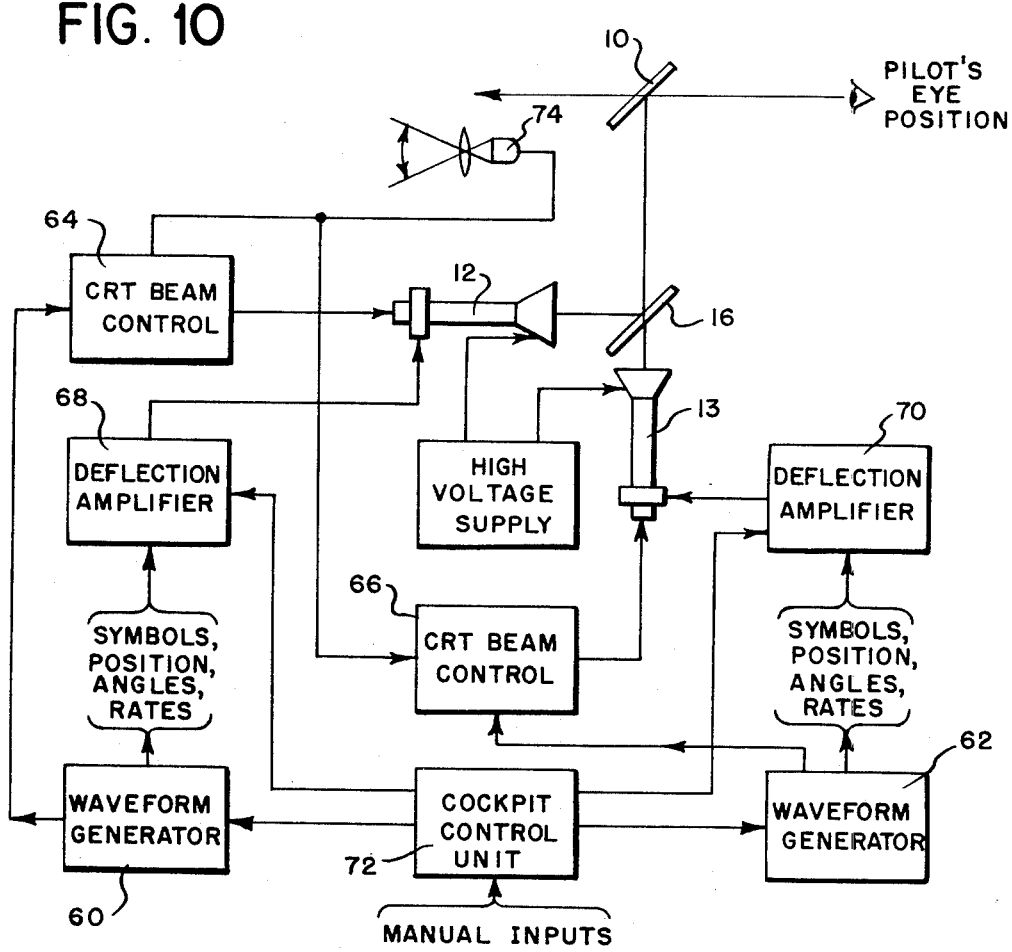
FIG. 10 is a block diagram of one form of apparatus according to the invention.

FIG. 10 is a block diagram of the electronic apparatus required to generate the information presented on the cathode ray tubes 14 and 16, viz, the runway R, the path P, the artificial horizon H, the pitch bar P.B. and the aircraft axes $H_2$ and $V_2$.

Separate waveform generators 60 and 62, beam intensity control units 64 and 66, and deflection amplifiers 68 and 70 are provided for the two tubes. Waveform generator 60 for tube 12 receives, from a stable platform in the aircraft, signals representative of pitch, roll and yaw angles of the aircraft. From the instrument landing system waveform generator 60 receives signals representative of the position of the aircraft with respect to the X and Y axes of the glide path of FIG. 5. It also receives a signal representative of instantaneous range $r$ to the touchdown point on the glide path. This signal may be provided from a so-called distance measuring installation or from apparatus in the aircraft which computes that range. Generator 60 also receives a signal representative of actual airspeed.

Waveform generator 62 receives, via a cockpit control unit 72, input signals representative of desired airspeed and of the glide slope angle at the airport in question and of the desired angle of attack or inclination of aircraft longitudinal axis to direction of flight. These signals may also be supplied from the cockpit control unit 72 to the waveform generator 60.

The waveform generators also modulate the cathode ray tube beam control units 64 and 66 which control the brightness of the display and both cathode ray tube beam control units are governed by a photocell 74 in the cockpit which looks out at the real world. In this manner, the relative brightness between displayed information and the real world or background illumination can be maintained constant after an initial setting by the pilot.

Figure 11A:
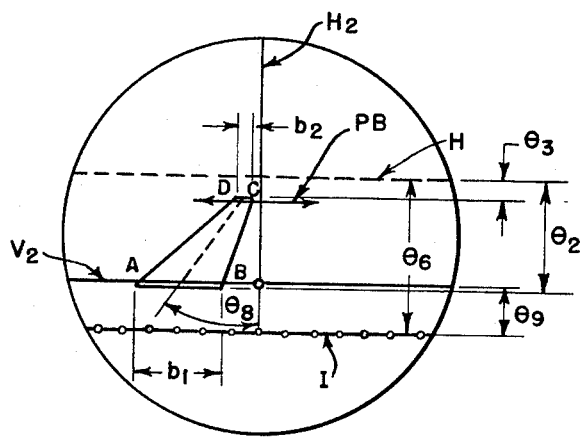
FIGS. 11A to 11C are diagrams similar to those of FIGS. 1A to 1C, 2A to 2C, and 3A to 3C, additionally indicating the variable parameters required to effect displacements, on the cathode ray tubes of FIG. 6, of various of the image components in accordance with aircraft position and attitude.
Figure 11B:
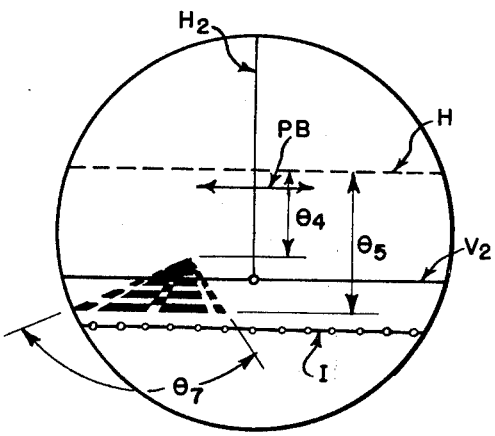
Figure 11C:
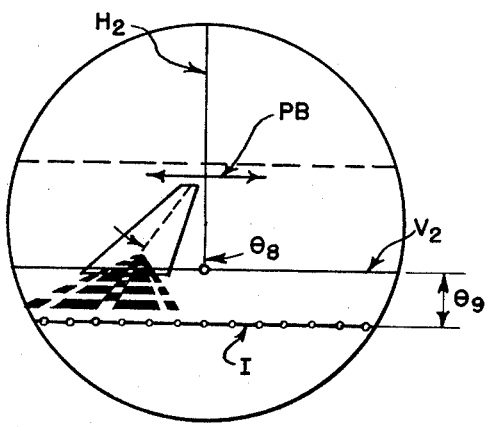
Figure 12:
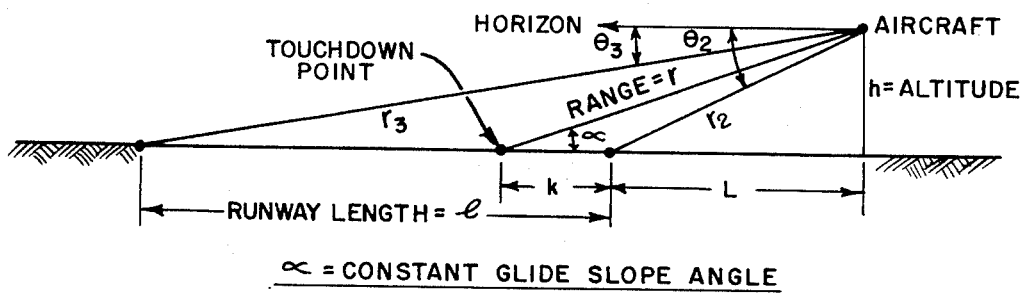
FIG. 12 is a diagram useful in describing the invention.

FIG. 11 demonstrates the angles and dimensions that must be developed for both cathode ray tubes in order to present the composite display as indicated in FIG. 11C. These angles and dimensions must be derived from aircraft instrumentation. As an example, FIG. 11A indicates that the runway taper can be generated from dimensions $b_1$, $b_2$ and angles $\theta_3$ and $\theta_2$. All dimensions on the face of a cathode ray tube which is feeding a collimating lens of a known focal length will convert to angles in the real world. $\theta_2$ and $\theta_3$ even though viewed as angles in the real world represent dimensions on the face of the cathode ray tube. Hence dimensions $b_1$ and $b_2$ will represent angles in the real world. $\theta_3$ will reduce gradually since the far edge of the runway will tend to approach the horizon as the aircraft altitude decreases. The same can be said of $\theta_2$ and both these angles will appear to increase with increase in aircraft altitude. Also $\theta_2 - \theta_3$ will reduce as distance to touchdown decreases. This variable is automatically varied as $\theta_2$ and $\theta_3$ are continuously solved for in the computations to be described. In FIG. 11B the aircraft index line I is set at a fixed angle with respect to the horizon and the aircraft axes are also set at a fixed angle with respect to the index line as shown in FIG. 11C. The pitch bar P.B. and index line I can be adjusted to the aircraft axes so that any angle of attack may be flown. In FIG. 20 for example, the plane of the landing gear is shown as an extension of the glide slope or the path in the sky. With the aircraft flying in at this attitude the plane of the landing gear can be indicated to coincide with the end of the apparent path in the sky if the index line is depressed through an angle $\theta_6$ from the horizon as shown in FIG. 11A. $\theta_6$ represents a dimension on the cathode ray tube face as indicated in FIG. 21. Note that the aircraft axes are pointed directly at the ideal touchdown point since the aircraft is flying in at 0 angle of attack. The dimension on the tube screen separating the aircraft pitch axis line $V_2$ and the index line is shown as $\theta_9$ in FIG. 21 and FIG. 11A. If the aircraft flies in with some incremental angle of attack it will be seen from FIG. 21 that $\theta_6$ would place the index line up above the path in the sky. In order to relocate the index line to be coincident with the path in the sky the angle between horizon and index line must be increased by an incremental angle $\Delta$ (FIG. 22) so that the angle from horizon to index line is $\theta_6 + \Delta$ and the angle between the aircraft longitudinal axis and the index line must also be increased from $\theta_9$ to $\theta_9 + \Delta$. Therefore, in a case where a pilot prefers to follow the glide slope with a given angle of attack other than 0, adjustments may be made to all of these indicator lines so that aircraft behavior displacement and angular rotation can be judged in the same manner as that of an aircraft approaching with a 0 angle of attack. In FIG. 11A it is seen that $\theta_2$ and $\theta_3$ must be continually solved for in order that apparent runway length can be varied. FIG. 12 shows that $\theta_2$ and $\theta_3$ are solvable for any conditions if the runway length is known as well as the ideal touchdown distance $k$ from the near end of the runway, the range to touchdown $r$, and the glide slope angle $\alpha$ for that particular runway. With these variables and the use of three resolvers, the angles $\theta_2$ and $\theta_3$ may be obtained in terms of analog voltages, the resolvers also providing voltages representative of aircraft altitude and range $r_2$ to near edge of runway and range $r_3$ to far end of runway.

The first resolver 80 receives one input voltage $e_1$ proportional, at a pre-selected scale, to the instantaneous slant range $r$ to the touchdown point. The rotor-stator angular position of the resolver is manually set to the known glide slope angle $\alpha$ for the runway in question. Consequently, there are produced on the output windings of the resolver voltages $e_2$ and $e_3$ proportional to $r \cos \alpha$ and $r \sin \alpha$ respectively. These are proportional to the horizontal range $L + k$ from the aircraft to the touchdown point (FIG. 12), and to the aircraft altitude $h$, assuming the aircraft to be on the glide path. A subtracting unit 82 reduces the voltage $e_2$ by an increment proportional to the distance $k$ from the near end of the runway to the touchdown point. The difference voltage $e_4$ so obtained, proportional to the horizontal range $L$ to the near end of the runway, is applied to one of the input windings of a second resolver 84 while the voltage $e_3$ proportional to the aircraft altitude $h$ is applied to the other input winding of the resolver 84. One of the output windings of resolver 84 is connected through an amplifier 86 to a motor 88 coupled to the rotor shaft of the resolver and drives that rotor until the input voltage to the motor declines to zero. The rotor of resolver 84 will then have taken up an angular position equal to the angle $\theta_2$ between the horizontal and the range $r_2$ to the near end of the runway. The voltage $e_5$ on the other output winding of resolver 84 will then be proportional to that range $r_2$.

A potentiometer 90 fed with a reference voltage $e_6$ will then deliver an output voltage $e_7$ proportional to the angle $\theta_2$ of interest.

In similar fashion the third resolver 92 solves the triangle whose perpendicular sides are the altitude $h$ and the horizontal range $L + l$ to the far end of the runway, delivering on one output winding a voltage $e_8$ proportional to $r_3$, the slant range to the far end of the runway, and from a potentiometer 94 a voltage $e_9$ proportional to the angle $\theta_3$ of FIG. 12.

Figure 13:
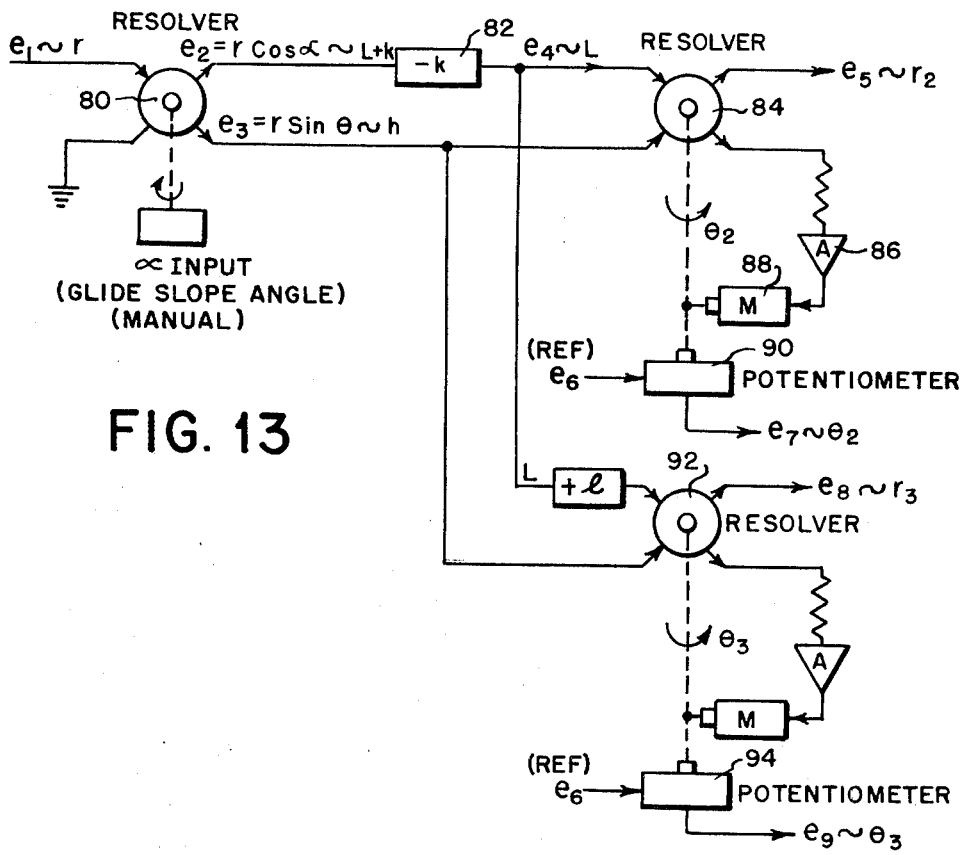
FIG. 13 is a diagram of apparatus useful, in one embodiment of the invention, in generating electrical signals representative of the slant range from the aircraft, when on the instrument landing glide path, to the near and far ends of the runway and of the slope angles of those ranges.

If next there is considered the appearance of the runway R and path P displayed when the aircraft is displaced to either side as shown in FIG. 11, it will be seen that the angle $\theta_8$ from axis $H_2$ to the center line of path P in FIG. 11A must be obtained. This $\theta_8$ can be obtained from the altitude $h$ and from the lateral translation $\Delta y$ of the aircraft from the center of the glide slope, $\theta_8$ being the angle whose tangent is $\Delta y/h$. $\Delta y$ is available from the flight director aboard the aircraft, and the altitude of the aircraft is available from the initial solution of FIG. 12. A resolver-servo combination as illustrated in FIG. 16 may be employed to develop a voltage representative of $\theta_8$, the resolver 96 receives on its input windings voltages $e_3$ proportional to the altitude $h$, for example as delivered from the resolver 80 of FIG. 13, and $e_{11}$ proportional to the lateral displacement $\Delta y$ of the aircraft from the center line of the glide slope path. When the resolver drives to a null on the output winding connected to motor 98, the resolver rotor will have assumed the angle $\theta_8$ of interest, and a voltage $e_{10}$ proportional to that angle may be obtained from the reference voltage $e_6$ by means of a potentiometer 100.

FIG. 15 illustrates apparatus from which there may be developed a voltage representative of the angle $\theta_4$ (FIG. 14) which measures the effect of variation in aircraft position above or below the glide path. In that figure, the aircraft is at a distance $\Delta z$ above the glide slope.

In FIG. 15 resolver 102 supplies a voltage $e_{12}$ proportional to the range $r + \Delta r$ from the aircraft to the touchdown point (FIG. 14), from input voltages $e_1$ and $e_{13}$ proportional to the range $r$ along the glide path and to the distance $\Delta z$ respectively, the latter of which is obtained from the glide path slope signals received on the aircraft. The resolver also supplies, with the aid of potentiometer 106 and reference voltage $e_6$, a voltage $e_{14}$ proportional to the angle $\beta$ between the glide slope range $r$ and actual range $r + \Delta r$. Addition in adder 108 of a voltage proportional to the glide path angle $\alpha$ derives from the voltage $e_{14}$ a voltage $e_{15}$ proportional to the angle $\theta_4$.

There remain to be developed voltages to be representative of the apparent near and far runway widths $b_1$ and $b_2$ of FIG. 11A. FIGS. 18 and 19 show resolver-servo combinations similar to those of FIGS. 15 and 16 by means of which this may be done. In FIG. 18 resolver 110 receives on one input winding the voltage $e_5$ representative of the range $r_2$ from the aircraft to the near end of the runway, obtained in FIG. 13. On its other input winding it receives a manually inserted voltage $e_{16}$ proportional to the half-width of the runway on which the aircraft is to be landed. See FIG. 17A. From these inputs the resolver 110 and the associated servomotor 112 develops a rotation $\phi_1/2$ equal to one-half the angle subtended by the near end of the runway (FIG. 17A) at the aircraft position. From a reference voltage $2e_6$ a potentiometer 114 coupled to the rotor of the resolver 110 develops a voltage $e_{17}$ proportional to the desired dimension $b_1$. A similar circuit illustrated in FIG. 19 develops on the shaft of a resolver 116 a voltage $e_{18}$ proportional to the desired dimension $b_2$. For this purpose the resolver 116 receives on one input winding the voltage $e_8$ (FIG. 13) proportional to the range $r_3$ to the far end of the runway. On its other input winding it receives the manually inserted voltage $e_{16}$ proportional to the half-width of the runway. With the aid of the servo loop, including motor 118 to which the resolver 116 is connected, there is developed on its rotor shaft from these inputs a rotation $\phi_2/2$ which is equal to one-half the angle subtended by the far end of the runway at the aircraft position. See FIG. 17A. Via a potentiometer 120 and a reference voltage $2e_6$, this rotation is transformed into a voltage $e_{18}$ proportional to the desired dimension $b_2$.

FIG. 9 illustrates diagrammatically the servo circuit employed to drive the cathode ray tube or tubes employed in the apparatus of the invention. In that figure a motor 122 receives from an amplifier 124 the difference between a voltage supplied on a conductor 126 and that delivered from a potentiometer 128 coupled to the motor, as determined in a subtracting unit 130.

In case of the motor 24 of FIG. 7 which functions to rotate the cathode ray tube associated therewith, the motor 122 of FIG. 9 represents that motor 24 and is coupled by the linkage described in connection with FIG. 7 to the lead screws 25 and nuts 27, and to the potentiometer 32 of FIG. 7, of which the potentiometer 128 of FIG. 9 is then representative. The input voltage on conductor 126 then represents the actual pitch angle of the aircraft as supplied from a stable platform in the aircraft which establishes true horizontal.

As a representation of the translational drive of motor 37 in FIG. 8, the conductor 126 of FIG. 9 receives an input voltage representative of the desired angle of attack of the aircraft, i.e., the inclination of the aircraft longitudinal axis in pitch to the direction of flight.

On each cathode ray tube, all data there to be presented may be presented by time sharing of a single electron beam, all such data being presented repetitively at a rate high enough to avoid flicker and (especially in the case of the path P) to give an illusion of continuous motion. There may be sixty complete representations or frames per second on each cathode ray tube, each frame being subdivided into a number of time intervals each allocated to a particular portion of the display on that tube. Each frame may comprise as in the usual television display a fixed number of scanning lines.

The "path in the sky" P comprises a center "roadway" R' made up of bars, and a pair of sidewalks S at the edges of the roadway R', also made up of bars. The roadway may have a center stripe St as indicated in FIGS. 1 to 4, whose blocks may be staggered with respect to the bars of the roadway R'. The bars of which the roadway R' and sidewalks S are made up move down the tube face. Those of which the sidewalks are made up move down the tube face at a rate representative of a manually inserted desired airspeed. That is, the apparent width of the bars of the sidewalk, as seen by the pilot in the form of virtual images, in conjunction with the rate of motion of the bars down the tube face, give to the pilot the visual impression of sidewalks which approach and pass under the aircraft at the airspeed rate so set in.

The width of the bars here in question is their width vertically of the tube on whose fluorescent screen they are displayed. It will be remembered that while the apex of the path P, as seen for example in FIGS. 1A to 1C, may be at or near the horizon line H and hence at or near infinity, the lower part of the path, where the bars are of more than line width, is inside the focal plane. Hence the bars in the lower part of the path P are perceived by the observer as having a finite width, increasing as they approach him.

The bars of the roadway R' (and its center strip St if provided) move down the tube face at a rate representative, in similar fashion, of actual airspeed. Hence when the aircraft is moving at desired airspeed the bars of the sidewalks and roadway keep step with each other. When the actual airspeed is greater than desired, the bars of the roadway appear to approach the aircraft faster than those of the sidewalks, and vice versa. Obviously, the association between desired and actual airspeeds on the one hand and sidewalk bars and roadway bars on the other hand may be interchanged from that above described, so that the roadway bars move at desired airspeed while the sidewalks move at actual airspeed.

To generate the path P on tube 12 and the runway R on tube 13, a vertical sweep is employed at frame rate. This sweep may be a parabolic function of time, so that the vertical spacing of the horizontal scanning lines increases from the top of the tube (as perceived for example in FIGS. 1 to 4) toward the bottom.

To locate correctly the center line of the pattern, i.e., of the path P on tube 12 and of the runway R on tube 13, there is formed a horizontal pattern center voltage, varying with time as a fixed fraction or multiple between plus one and minus one times the vertical sweep voltage. When the multiple is zero the pattern will be centered, as in FIGS. 1A to 1C and 3A to 3C. When the multiple is not zero, the horizontal pattern center voltage will shift the pattern to the right (as in FIGS. 2A to 2C) or to the left.

Voltages defining the edges of the patterns and the separation between the sidewalks S and roadway R' in the path pattern P are then obtained by adding to the horizontal pattern center voltage suitable positive and negative fractions of the vertical sweep voltage.

A horizontal sweep voltage then moves the beam transversely within the limits defined by the right and left limiting voltages. Due to the non-linear nature of the vertical sweep, a given number of horizontal sweeps will occupy increasing vertical height on the tube face with approach to the bottom of the tube face.

The bars in the sidewalks S and roadway R' of the path P are then generated by counting out groups of the horizontal sweeps and using alternate groups to intensify the cathode ray beam. To give apparent motion to the bar pattern, the starting count for the horizontal sweep generation is suitably decremented in successive frames, with separate bars being generated for the sidewalks S and the roadway R' with suitably different decrements when the actual and desired airspeeds are unequal.

Signals representative of the center line of the pattern, of the outer edges of the sidewalks S, of the edges of the roadway R', and of the bars to be presented in each frame are then combined to produce appropriate unblanking signals on the intensity control electrodes of the cathode ray tubes.

Two completely independent bar generation systems are provided, one for the sidewalks S and the other for the roadway R'.

The runway R may be presented as a trapezoid, i.e., as a trapezoidal figure and not as a trapezoidal area, in order to permit showing of that part of the path P which overlies the runway.

The pitch bar P.B. and index line I on tube 12 are generated by means of a common single sweep generator operated once per frame for each function. The artificial horizon H is similarly generated for presentation on the tube 13 (assuming the distribution of these data elements among tubes 12 and 13 hereinabove set out by way of example).

While servo systems utilizing resolvers have been disclosed as computing elements for determination of various of the quantities employed in the display of the invention, solid state devices may be employed for these computations instead.

The apparatus for generation and control of the sweep and intensity controlling voltages is the joint invention of the present applicant Joseph La Russa and of Matthew C. Baum, and will be claimed in an application of those inventors presently to be filed and assigned to the assignee hereof.

I claim:

1. Apparatus for display in an aircraft, in the pilot's field of vision, of a representation of a path of approach to a runway, said path including a portion perceived at a finite distance and a portion perceived at an infinite distance, said apparatus comprising lens means having dioptric power and having a focal plane, means positioned on one side of said lens means to present a representation of a runway on a surface intersecting said focal plane with a portion of said representation on that part of said surface which is between said lens means and focal plane, and a partially reflecting plane mirror positioned on the other side of said lens means to form an image of said representation as imaged by said lens means.

2. Apparatus for display in an aircraft, in the pilot's field of vision, of a representation of a path of approach to a runway, said path including a portion perceived at a finite distance and a portion perceived at an infinite distance, said apparatus comprising lens means having dioptric power and having a focal plane, a cathode ray tube positioned on one side of said lens means and having a fluorescent screen, means to support said tube with its fluorescent screen obliquely inclined to and intersecting said focal plane, means to present on said screen a pattern of signals representative of a trapezoid and of a line parallel to the base of the trapezoid and having a variable spacing from the base of the trapezoid with said line being substantially parallel to said focal plane and at a fixed distance from said focal plane on the side thereof adjacent said lens means, and a partially reflecting plane mirror positioned on the other side of said lens means to form an image of said screen as imaged by said lens means.

* * * * *